:::
United States Patent Office 3,483,103
Patented Dec. 9, 1969

3,483,103
PROCESS FOR PREPARING 1,2-
DICYANOCYCLOBUTANE
Shigeru Wakamatsu and Shuntaro Hosaka, Nagoya,
Japan, assignors to Toyo Rayon Kabushiki Kaisha,
Chuo-ku, Tokyo, Japan, a corporation of Japan
No Drawing. Filed Dec. 19, 1966, Ser. No. 602,602
Claims priority, application Japan, Dec. 23, 1965,
40/78,934
Int. Cl. B01j 1/10
U.S. Cl. 204—158                          9 Claims

ABSTRACT OF THE DISCLOSURE 1,2-dicyanocyclobutane is selectively obtained in high yield by a process comprising irradiating acrylonitrile with a light having a wavelength of 1700 A.–5000 A. in the copresence of a sensitizer whose energy at the excited triplet state is at least 58 Kcal./mol. Such a reaction is optionally conducted in the presence of a catalyst.

---

This invention relates to a process for preparing 1,2-dicyanocyclobutane remarkably advantageously as compared with the conventional process, in particular, this invention relates to a process for preparing 1,2-dicyanocyclobutane which comprises irradiating a light having a wavelength of between 1700A. and 5000 A. to acrylonitrile in the co-presence of a sensitizer whose energy at the excited triplet state (hereinafter may be referred to as Et.) is at least 58 Kcal./mol in the optional presence of a solvent.

Heretofore, as shown in the following formula, it has been known to prepare 1,2 - dicyanocyclobutane from acrylonitrile.

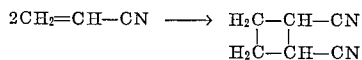

The obtained 1,2-dicyanocyclobutane is an industrially useful substance, for instance, it can be converted to hexamethylene diamine, a material for preparing nylon by ring opening and reducing with hydrogen.

However, in the conventional processes, it is necessary, more or less, to react the material acrylonitrile at a considerably high temperature under a considerably high pressure, resulting in industrial disadvantage in operation and apparatus, not only that, but also high molecular weight polymers and other troublesome by-products tend to be brought about, and the objective 1,2-dicyanocyclobutane cannot be satisfied in respect of purity and/or yield.

When a few examples of such hitherto proposed processes is cited, in E. C. Coyner, W. S. Hillman, J. Am. Chem. Soc. 71, 324 (1949), it was reported for the first time that 1,2-dicyanocyclobutane was prepared, although at a low yield, from acrylonitrile at a high temperature under a high pressure in the presence of hydroquinone as a polymerization inhibitor.

In German Patent 1,081,008, a process for carrying out the reaction at a high temperature of 230–250° C. under a high pressure of 20–50 atmospheres in the presence of a NO gas is proposed, while in German Patent 1,013,330 a process for carrying out the reaction at a high temperature under a high pressure such as at 240° C. under 50 atmospheres in the presence of a sulfide of a metal such as, for instance, nickel, tungsten, cobalt, iron, barium and zinc is proposed.

Further, in French Patent 1,397,085 (Belgian Patent 648,868), a process for carrying out the reaction at a high temperature of 180–260° C. under a high pressure of 10–100 atmospheres in the presence of a NO gas and water whose pH being less than 7 is proposed, while in British Patent 897,275 (U.S. Patent 3,265,723), a process for carrying out the reaction at a high temperature of 250–350° C. under a high pressure of 70–350 atmospheres in the presence of water whose pH being less than 8 is proposed.

In U.S. Patent 3,202,697, a process for carrying out the reaction in a sealed zone in the presence of EDTA or other chelate reagents at a high temperature of 195°–246° C. under a high pressure is proposed, while in U.S. Patent 3,275,675 a process for carrying out the reaction in a sealed zone in the presence of an indigo dye such as indigo Carmine at a high temperature of 175°–350° C. under a high pressure is proposed, on the other hand, in Belgian Patent 674,068 (Dutch Patent 16,357/65) a process for carrying out the reaction in the co-presence of butyl phthalate and hydroquinone at a high temperature of 200–400° C. under a high pressure of 50–1000 atmospheres is proposed.

In these many proposals, various processes wherein the reactions are carried out in the presence of different substances supposed to be useful for inhibiting or stabilizing polymerization are recommended, however, in each of these processes the reaction must be carried out at a high temperature under a high pressure, therefore, it is inevitable that each of these processes is unavoidably accompanied by many technical disadvantages in respect of operation and apparatus, production of by-products as well as purity and/or yield of which mention has been made.

On the other hand, it is also a well-known fact that acrylonitrile easily polymerizes to form a high molecular weight polymer. In the aforementioned many proposals, the technical concepts are concentrated on how to selectively produce 1,2-dicyanocyclobutane and prevent the material from becoming a high polymer.

As a result of studying how to avoid hardly inevitable technical disadvantage of such a high temperature, high pressure process to selectively produce 1,2-dicyanocyclobutane industrially advantageously, the present inventors have found that the object is selectively obtained by utilizing a photochemical reaction in the presence of a certain kind of sensitizer at as low a temperature as possible and/or under as low a pressure as possible, normally a temperature higher than the melting point of acrylonitrile but below the boiling point thereof, preferably below 60° C., more preferably below 40° C., especially advantageously a cool temperature of from the temperature of the natural atmosphere of the reaction system to the temperature where the reaction system does not become a solid phase and/or a pressure of the natural atmosphere of the reaction system, preferably atmospheric pressure.

That acrylonitrile monomer tending to polymerize to form a high molecular weight polymer is selectively converted to a dimer thereof, 1,2-dicyanocyclobutane by a photochemical reaction in the presence of a sensitizer and conversion thereof to a higher polymer is inhibited are entirely unexpected results. When it is taken into account that photochemical reaction means are means whose applicable possibility is very difficult to predict depending upon the kinds of the starting material and the object, the results are more surprising ones.

Thus, it has been found that the common technical disadvantages owned by the many hitherto proposed processes could be advantageously overcome and a process for preparing 1,2-dicyanocyclobutane industrially remarkably advantageously of being operable at room temperature under atmospheric pressure can be provided.

Accordingly, an object of this invention is to provide a process for selectively preparing 1,2-dicyanocyclobutane from acrylonitrile at a high purity and a high yield by overcoming at one stroke many technical disadvantages inevitably accompanied with the hitherto known high temperature, high pressure processes.

Many other objects and advantages of this invention will become clearer from the following description.

In the process of this invention, a light is irradiated to acrylonitrile in the presence of a sensitizer in the optional presence of a solvent, and as a sensitizer used in this case that which whose Et being more than 58 Kcal./mol must be selectively used. However, any substance whose Et is more than 58 Kcal./mol will do and the size of the value thereabove does not become any obstacle for achieving the object of this invention.

Since it goes without saying that the sensitizer would exist in a dissolved state in the photochemical reaction system, it is natural that the sensitizer soluble in acrylonitrile should be selected when the reaction is carried out in the absence of a solvent, and when the reaction is carried out in the presence of a solvent, the sensitizer soluble in acrylonitrile and/or the solvent should be selected, and it should be understood that a sensitizer whose Et is at least 58 Kcal./mol as referred to in this invention is directed to a sensitizer provided with such properties. And it suffices if the sensitizer is soluble at the temperature of the reaction system and when a solvent is used, it goes without saying that the sensitizer can be properly selected in accordance with the temperature of the reaction system and the kind of the solvent.

The energy at the excited triplet state is, as is well-known, when a substance returns to its ground state from its excited state, an energy level at an excited triplet state which according to the kind of substance, the substance once passes, the details being described in W. G. Herkstoeter, A. A. Lamola and G. S. Hammond, J. of A. S., 86, 4537 (1964).

The Et value of a substance having the excited triplet state is measured and calculated as follows, and many values are known with reference to many substances.

Namely, it is sought from the phosphorescene spectrum of a sample dissolved in a clear rigid solvent mixture of 350° K. In this case, a solvent, a polar solvent is selected.

The sensitizer whose Et value is at least 58 in this invention is directed to what is measured in a polar solvent as mentioned above.

As such sensitizer, there may be cited, for instance, propiophenone, xanthone, thioxanthone, acetophenone, benzophenone, phenylbenzophenone, p - methoxybenzophenone, 4,4' - dichlorobenzophenone, p - cyanobenzophenone, isobutylophenone, benzaldehyde, cyclopropylphenyl ketone, p - diacetyl benzene, 1,3,5 - triacetylbenzene, o - dibenzoylbenzene, 1,3 - diphenyl - 2 - propanone, triphenylmethylphenyl ketone, dibenzothiophen, carbazole, triphenylamine, fluorene, triphenylene, chrysene, anthraquinone, phenanthrene, β - naphtaldehyde and diphenylene oxide.

The using amount of the sensitizer, that is concentration of the sensitizer in the reaction system has no direct relation with the reaction, and in this invention it is enough to make the sensitizer whose Et is at least 58 Kcal./mol exist in the reaction system. However, industrially it is better to use such concentration as making good the utilization efficiency of a light, in other word, a concentration whereby while the light passes through the liquid layer of the reaction system, namely, in the thickness of the liquid layer, the majority of the light as possible more than 60% may be substantially absorbed within the effective wave length scope, preferably as much had better be used. Accordingly, the using had better be properly selected according to the kind of sensitizer used, effective wave length scope of the light used and thickness of the reaction liquid layer. Normally it is preferable to use the concentration whereby absorption ratio of from 60% to about 100%, advantageously 80–99% may be obtained. The sensitizer is not limited to one kind, but a plurality thereof may be made to coexist. Unless the sensitizer having the aforesaid Et value is utilized, the objective reaction hardly takes place.

The light used in the process of this invention is a light having a wave length within the range of from 1700 A. to 5000 A.

$\lambda_{max}$ (absorption maximum) of acrylonitrile is 2155 A. It goes without saying that the reaction does not proceed without using the sensitizer but using a light having a wave length exceeding $\lambda_{max}$=2155 A. only, even when ultraviolet ray having a short wave length below $\lambda_{max}$= 2155 A. is used in the absence of the sensitizer the objective reaction proceeds only to an extent where it is substantially negligible.

Whereas, in the co-presence of the sensitizer of which mention has been made the photochemical reaction from acrylonitrile to 1,2-dicyanocylobutane proceeds with ultraviolet ray or a visible ray having a long wave length not absorbed by said nitrile. It goes without saying that effectiveness to the reaction of a light having a wave length of absorption maximum of acrylonitrile or lower than that increases remarkably in the co-presence of the sensitizer.

Accordingly, by utilization of the sensitizer, the effective wave length scope expands and all light sources emitting lights having wave lengths within the range of 1700 A.–5000 A. become utilizable. As a result, as the material of members through which a light passes in the light source and the reactor, use of glass becomes possible and a material which may obstruct transmission of a light having a weight length lower than the absorption maximum can be used, therefore, limitation on materials disappears and an industrial advantage is more increased.

As a light source, for instance, a high-pressure mercury lamp, a super high-pressure mercury lamp, a fluorescent lamp and xenon lamp are utilizable, however, if desired, it is possible to utilize a light whose light having a wave length outside said range is positively eliminated by utilizing a substance absorbing a light whose wave ength is outside said range. It is normal to provide a light source within the reaction zone, however, it is possible to so provide a light source that light is irradiated from outside the zone.

Also in the process of this invention it is possible to rarry out the photochemical reaction in the presence of a solvent, namely a solvent chemically inert to the sensitizer and acrylonitrile, dissolving them to make the reaction system a liquid phase. However, it goes without saying that such a solvent substantially absorbing a light whose scope of wave length is same as that absorbed by the sensitizer used whereby obstructuring the sensitizer from absorbing such light should not be used. Accordingly, it should be understood that the solvent as referred to in this invention is directed to what has the aforementioned properties and substantially not obstructing absorption of a light by the sensitizer.

Such a solvent can be easily selected by those skilled in the art by taking into account the wave length to be absorbed, absorbance and the kind of sensitizer. In this case, if desired it is possible to concurrently use experimental selection.

Combination of the solvent and the sensitizer is desirably selected properly pursuant to the afore-mentioned requirement.

As such solvent, there may be cited, for instance, water; an aliphatic alcohol such as methanol, ethanol, isopropanol, n-butanol and t-butanol; chain and ring aliphatic hydrocarbons such as pentane, hexene, heptane, cyclohexane and methyl cyclohexane; a lower fatty acid such as formic acid, propionic acid, acetic acid and butyric acid; an aliphatic nitrile such as acetonitrile, propionitrile and butyrontrile; chain and ring aliphatic ethers such as diethylether, diisopropylether, tetrahydrofuran, and dioxane; an aliphatic ester such as ethyl formate, ethyl acetate and amyl acetate; an aliphatic ketene such as acetone and methylethyl ketone; a chlorinated hydrocarbon such as chloroform, methylene chloride, carbon tetrachloride and ethylene dichloride; and organic solvents such as benzene, toluene, xylene, pyridine, dimethyl formamide, dimethyl acetamide and dimethyl sulfoxide.

They may be used singly or in combination. Because they have using aptitude to the sensitizers of a broader scope, acetonitrile and acetic acid are especially desirable solvents.

Utilization of a solvent, in case the object is isolated from the reaction product, is inevitably accompanied by an operation to separate the solvent, however, it is advantageous in case solubility of the character is insufficient or in case the reaction is carried out at a temperature above the temperature of the natural atmosphere of the reaction system, for instance above 20° C.

In case of the former, it is sufficient to add a solvent in an amount sufficient to dissolve said sensitizer in acrylonitrile in the presence of the solvent, however, in case of the latter, it is better to use a solvent in such an amount as to make concentration of acrylonitrile 5–80% by weight with a view to preventing production of higher polymers other than 1,2-dicyanocyclobutane and helping selectively producing the object.

In accordance with the process of this invention, the reaction at a temperature as low as possible or under a pressure as low as possible, especially advantageously at a low temperature under a low pressure becomes possible and the technical difficulties inevitably accompanied with the conventional high-temperature, high-pressure process are overcome. Especially that a low-temperature reaction becomes possible remarkably inhibits occurrence of an inconvenient said reaction and assists selectivity of conversion to 1,2-dicyanocyclobutane due to existence of a selective sensitizer.

Further, because adoption of a low pressure condition becomes possible, preferably by adopting a low temperature and a low pressure condition the operation and the apparatus become remarkably advantageous.

In this invention, the reaction is carried out normally at a temperature higher than the melting point of acrylonitrile but lower than the boiling point thereof, preferably 60° C. more preferably below 40°, especially advantageously from a temperature of the natural atmosphere temperature not specially heated) to a cold temperature at which the reaction system does not become a solid phase. For instance, the reaction under cold temperature condition of from 40° C. to −80° C. is preferable. In case the temperature is as high as possible, as mentioned above, it is possible to utilize, a solvent, or as will be mentioned later utilize a known polymerization inhibitor for acrylonitrile to be of use for preventing occurrence of an inconvenient side reaction.

In the process of this invention, there is no substantial influence by difference of temperature over proceeding of the photochemical reaction, however, it is better to adopt a temperature within the scope remarkably low as compared with that of the conventional process for preventing occurrence of a side reaction and sufficiently achieving advantage of the operation and the apparatus.

Further, even when the reaction is carried out within the substantially sealed zone, the pressure condition naturally lowers in concomitance with a low temperature operation and the autogenous pressure is remarkably low as compared with that of the conventional process. Unless such an operation is particularly desired, normally the reaction is carried out under atmospheric pressure.

In the conventional processes, adoption of high-temperature, high-pressure conditions are required. In contrast, industrial advantage of the process of this invention carried out at a low temperature or under low-temperature, low-pressure condition is self-evident.

The reaction can be carried out batchwise or continuously and if desired it is possible to carry out the photochemical reaction by adding other additives or substituting the air inside the reactor by an inert gas such as nitrogen gas or carbon dioxide gas.

When a small amount of a compound known as a polymerization inhibitor for acrylonitrile is added to and made to exist in the reaction system, the objective photochemical reaction is not obstructed. Rather, in many cases it is useful for preventing by-production of a high molecular weight polymer and tends to assist a sensitizer used in this photochemical reaction to have a selective action to conversion from acrylonitrile to 1,2-dicyanocyclobutane under irradiation of a light having a wave length of 1700 A–5000 A.

As such a known polymerization inhibitor, there may be cited, for instance, ammonia, 2-aminopropionitrile, bis-2-cyanoethylamine, p-methoxyphenol, hydroquinone and p-quinone. Of these, ammonia is preferable.

Since this invention is a process utilizing photochemical reaction means, it goes without saying that selection and addition of such a polymerization inhibitor as reacting with the reaction system, obstructing absorption of a light having a wave length of 1700 A.–5000 A. by the sensitizer or substantially lowering the absorbed amount should be excluded from the process of this invention. Selection of the polymerization inhibitor is, as mentioned above in connection with selection of the solvent, what can be easily done by those skilled in the art. Accordingly, it should be understood that a polymerization inhibitor for acrylonitrile as referred to in this invention is directed to what excludes such inconvenient inhibitor as mentioned above.

Next, a few embodiment of the process of this invention will be explained with reference to examples together with controls.

EXAMPLES 1–4

A stainless steel container provided with a high-pressure mercury lamp having a glass jacket for cooling with water was charged with 50 parts by weight of acrylonitrile (AN) and 1 part by weight of a sensitizer and acrylonitrile was irradiated with the high-pressure mercury lamp in the optional presence of a solvent under atomspheric pressure for 8 hours. The liquid temperature of the reaction system was maintained at about 20° C. The results were as shown in the following Table 1.

TABLE 1

| No. | Sensitizer used Name | Et (Kcal./mol) | Solvent and (amount used by parts by weight) | Produced 1,2-dicyanocyclobutane (DCB) Produced amount (parts by wt.) | Amount of trans-type and cis-type in DCB (percent by wt.) Trans-type | Cis-type | Conversion ratio of by-produced straight-chain high polymer to AN (percent) | Conversion ratio of AN to DCB (percent) | Yield of DCB to the consumed AN (percent) |
|---|---|---|---|---|---|---|---|---|---|
| Ex. 1 | Benzophenone | 69.2 | | 16.2 | 42 | 58 | Trace | 26.4 | ca. 100 |
| Ex. 2 | Benzoaldehyde | 72 | | 10.1 | 47 | 53 | 1.3 | 20.2 | 94 |
| Ex. 3 | Benzophenone | 69.2 | Acetonitrile (50) | 12.9 | 42 | 58 | Trace | 25.8 | ca. 100 |
| Ex. 4 | Benzoaldehyde | 72 | Acetic acid (50) | 10.6 | 47 | 53 | Trace | 21.2 | ca. 100 |

EXAMPLE 5–12

The apparatus same as that in Example 1 was used. The reactor was charged with a solution mixing 50 parts by weight of acrylonitrile (AN), 50 parts by weight of a solvent and 1 part by weight of a sensitizer, and the solution was irradiated by the high-pressure mercury lamp at 20° C. under atmospheric pressure for 6 hours. The irradiation was carried out after the air inside the reactor was substituted by nitrogen gas. The results were as shown in Table 2. In said table for the purpose of comparison, controls wherein Et. values being lower than the value required for a sensitizer used in this invention were listed together.

TABLE 2

| No. | Sensitizer used Name | Et (Kcal./mol) | Solvent and (amount used by parts by weight) | Produced 1,2-dicyanocyclobutane (DCB) Produced amount (parts by wt.) | Amount of trans-type and cis-type in DCB (percent by wt.) Trans-type | Cis-type | Conversion ratio of by-produced straight-chain high polymer to AN (percent) | Conversion ratio of AN to DCB (percent) | Yield of DCB to the consumed AN (percent) |
|---|---|---|---|---|---|---|---|---|---|
| Ex. 5 | Propiophenone | 76.4 | Acetonitrile | 2.5 | 31 | 69 | 0 | 5.0 | 100 |
| Ex. 6 | Acetophenone | 76.3 | do | 3.9 | 40 | 60 | 0 | 7.8 | 100 |
| Ex. 7 | Xanthone | 76.2 | Chloroform | 2.8 | 44 | 56 | 1.4 | 5.6 | 75 |
| Ex. 8 | Benzoaldehyde | 72.0 | Acetonitrile | 8.0 | 40 | 60 | 0.8 | 16.0 | 95 |
| Ex. 9 | Carbazole | 70.0 | Acetone | 3.3 | 56 | 44 | 1.8 | 6.6 | 78 |
| Ex. 10 | Benzopenone | 69.2 | Acetonitrile | 9.6 | 42 | 58 | 0 | 19.2 | 100 |
| Ex. 11 | Penylbenzophenone | 62.8 | Benzene | 4.3 | 48 | 52 | 2.0 | 8.6 | 81 |
| Ex. 12 | Naphthalene | 61 | Acetonitrile | Trace |  |  | 0 | Trace |  |
| Cont. 1 | Benzyl | 57.3 | do | 0 |  |  | 0 | 0 |  |
| Cont. 2 | Eosine | 43.0 | do | 0 |  |  | 0 | 0 |  |
| Cont. 3 | Anthracene | 42.0 | do | 0 |  |  | 0 | 0 |  |

EXAMPLE 13

Using the apparatus same as that in Example 1, as sensitizer 1 part by weight of benzophenone (Et=69.2), as solvent 50 parts by weight of acetonitrile or acetic acid, and 50 or 100 parts by weight of the material acrylonitrile being used, further optionally using as polymerization inhibitor 1 part by weight of a 28% ammonia water, varying the temperature of the reaction system, the reactions were carried out under atmospheric pressure under irradiation by the high-pressure mercury lamp for 8 hours. Prior to the irradiation, nitrogen gas was passed through the acrylonitrile and the solvent to deoxygenate and the air in the reaction zone was substituted by nitrogen gas, and the irradiation was carried out. The results were as shown in the following Table 3.

4. A process described in claim 1 wherein said irradiation is carried out under a pressure below the autogenous pressure of the reaction system.

5. A process described in claim 4 wherein said irradiation is carried out under atmospheric pressure.

6. A process described in claim 1 wherein said irradiation is carried out in the presence of a solvent selected from the group consisting of acetic acid and acetonitrile.

7. A process described in claim 1 wherein said sensitizer is selected from the group consisting of propiophenone, xanthone, thioxanthone, acetophenone, benzaldehyde, benzophenone, phenylbenzophenone, p-methoxy benzophenone, 4,4'-dichlorobenzophenone, p-cyanobenzophenone, cyclopropyl phenyl ketone, p-diacetylbenzene, 1,3,5-triacetylbenzene, o-dibenzoylbenzene, isobutyrophenone, 1,3-diphenyl-2-propanone, triphenylmethylphenyl ketone, dibenzoylthiophene, carbazole, triphenylamine, fluorene, triphenylene, chrysene, anthraquinone, phenanthrene, $\beta$-naphthaldehyde and diphenyl oxide.

8. A process described in claim 1 wherein said sensitizer is added to the reaction system in an amount capable

TABLE 3

| Acrylonitrile (parts by weight) | Inhibitor (parts by weight) | Temp. (° C.) | Solvent and (parts by weight) | Produced 1,2-dicyanocyclobutane (DCB) Produced Amount (parts by wt.) | Amount of trans-type and Cis-type in DCB (percent by wt.) Trans-type | Cis-type | Conversion ratio of by-produced straight-chain high polymer to AN (percent) | Conversion ratio of AN to DCB (percent) | Yield of DCB to the consumed AN (percent) |
|---|---|---|---|---|---|---|---|---|---|
| 50 | Ammonia Water (1) | 40 | Acetonitrile (50) | 14.3 | 40 | 60 | 10.9 | 28.6 | 72.3 |
| 50 | do | 30 | do | 13.5 | 39 | 61 | 2.4 | 27.0 | 91.7 |
| 50 | do | 20 | do | 13.2 | 43 | 57 | 0 | 26.2 | 100 |
| 50 | do | 10 | do | 13.0 | 41 | 59 | 0 | 26.0 | 100 |
| 100 | do | 20 |  | 27.0 | 45 | 55 | 0 | 21.0 | 100 |
| 100 |  | 0 |  | 25.8 | 41 | 59 | 0 | 25.8 | 100 |
| 100 |  | −30 |  | 23.8 | 42 | 58 | 0 | 23.8 | 100 |
| 50 |  | 20 | Acetic acid (50) | 12.4 | 63 | 37 | 2.2 | 24.8 | 92.0 |
| 50 | Paramethoxy pehnol. | 20 | Acetonitrile (50) | 11.4 | 46 | 54 | 1.3 | 22.8 | 94.6 |

What is claimed is:

1. A process for preparing 1,2-dicyanocyclobutane which comprises irradiating acrylonitrile by a light having a wavelength of 1700 A.–5000 A. in the co-presence of a sensitizer whose energy at the excited triplet state is at least 58 Kcal./mol.

2. A process described in claim 1 wherein said irradiation is carried out at a temperature above the melting point but below the boiling point of acrylonitrile.

3. A process described in claim 2 wherein said irradiation is carried out at a temperature within the range of from 60° C. to −80° C.

of absorbing 60–100% of said light having a wave length of 1700 A.–5000 A. in the thickness of the irradiated liquid.

9. A process described in claim 1 wherein said irradiation is carried out in the presence of a polymerization inhibitor for acrylonitrile.

References Cited

UNITED STATES PATENTS 3,203,973   8/1965   Griffin _____ 204—158

HOWARD S. WILLIAMS, Primary Examiner